United States Patent
Ho et al.

(10) Patent No.: US 11,755,300 B1
(45) Date of Patent: Sep. 12, 2023

(54) SYSTEMS AND METHODS FOR ARRAY STRUCTURE PROCESSING

(71) Applicant: HUAWEI TECHNOLOGIES CO., LTD., Shenzhen (CN)

(72) Inventors: Man Pok Ho, Markham (CA); Henry Fangli Kao, Calgary (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/836,581

(22) Filed: Jun. 9, 2022

(51) Int. Cl.
   G06F 8/41 (2018.01)
(52) U.S. Cl.
   CPC .................. G06F 8/4442 (2013.01)
(58) Field of Classification Search
   CPC .................................................. G06F 8/4442
   See application file for complete search history.

(56) References Cited

U.S. PATENT DOCUMENTS

| 8,910,135 B2 | 12/2014 | Lai | |
| 10,275,230 B2* | 4/2019 | Mani | G06F 8/43 |
| 2009/0199169 A1* | 8/2009 | Lin | G06F 8/443 |
| | | | 717/159 |
| 2012/0110561 A1* | 5/2012 | Lai | G06F 8/4442 |
| | | | 717/151 |

OTHER PUBLICATIONS

Chakrabarti, G. et al., "Structure Layout Optimizations in the Open64 Compiler: Design, Implementation and Measurements," 2008, 11 pages.
"MCF, GCCSpec2017/Mcf—GCC Wiki," Web page <https://gcc.gnu.org/wiki/GCCSpec2017/mcf>, 9 pages retrieved Apr. 4, 2022.

* cited by examiner

Primary Examiner — Marina Lee

(57) ABSTRACT

A compiler optimization for structure peeling an array of structures (AOS) into a structure of arrays (SOA) by which a pointer to an array in the original program, is transformed into a tagged index that includes both an array index, and a memory identifier tagging the array index. Once processed by the compiler, each array index is identified by a respective memory identifier, hence if the program instructions call for redefining an array during run time, its array element can still be retrieved by referring to the memory identifier it is tagged with.

20 Claims, 9 Drawing Sheets

Prior Art

// Definition of structure with two fields
typedef struct { int a; float b; } str;     — 105

// Allocation of AoS
str *arr = (str *)malloc(N * sizeof(str));   — 110

// Loop 1 -- storing into first field
for (int i = 0; i < N; i++)                  — 115
    arr[i].a = ...;                          — 120

// Loop 2 -- loading from second field
for (int i = 0; i < N; i++)                  — 125
    ... = arr[i].b;

```
// Peeled structure
typedef struct { int a; } str_a;      ← 205
typedef struct { float b; } str_b;    ← 210

// Peeled allocations
str_a *arr_a = (str_a *)malloc(N * sizeof(str_a));    ← 212
str_b *arr_b = (str_b *)malloc(N * sizeof(str_b));    ← 215

// Loop 1 -- storing into first field
for (int i = 0; i < N; i++)           ← 220
    arr_a[i] = ...;

// Loop 2 -- loading from second field
for (int i = 0; i < N; i++)           ← 225
    ... = arr_b[i];
```

305 → // Definition of structure with two fields
typedef struct { int a; float b; } str;

310 → // Allocation 1 of AOS
str *arr_1 = (str *)malloc(N * sizeof(str));

315 → // Allocation 2 of AOS
str *arr_2 = (str *)malloc(N * sizeof(str));

320 → // Swap array pointers
if (some_var) { arr_1 = arr_2; }

Fig. 3

```
1 typedef struct {
2     int a;
3     float b;
4 } str;
5 str *alpha = (str *)malloc(N * sizeof(str));
6 str *beta = (str *)malloc(M * sizeof(str));
7 for (int i = 0; i < N; i++)
8     alpha[i].a = ...;
9 for (int i = 0; i < N; i++)
10    ... = alpha[i].b;
11 if (some_condition) { alpha = beta; }
12 for (int i = 0; i < M; i++)
13    ... = alpha[i].a;
```

```
605  { 1 typedef struct { int a; } str_a;
     { 2 typedef struct { float b; } str_b;
610  → 3 str_a **field_a = ...; // container for all the arrays for peeled field a
615  → 4 str_b **field_b = ...; // container for all the arrays for peeled field b
617  → 5 int alpha = 0;
620  { 6 str_a *alpha_a = (str_a *)malloc(N * sizeof(str_a));
     { 7 str_b *alpha_b = (str_b *)malloc(N * sizeof(str_b));
621  → 8 assignMemID(alpha, id_0);
622  { 9 field_a[id_0] = alpha_a;
     { 10 field_b[id_0] = alpha_b;
623  → 11 int beta = 0;
625  { 12 str_a *beta_a = (str_a *)malloc(N * sizeof(str_a));
     { 13 str_b *beta_b = (str_b *)malloc(N * sizeof(str_b));
630  → 14 assignMemID(beta, id_1);
635  { 15 field_a[id_1] = beta_a;
     { 16 field_b[id_1] = beta_b;
637  { 17 memID = getMemID(alpha);
     { 18 index = getIndex(alpha);
640  { 19 for (int i = 0; i < N; i++)
     { 20   field_a[memID][index + i] = ... ;
645  { 21 memID = getMemID(alpha);
     { 22 index = getIndex(alpha);
     { 23 for (int i = 0; i < N; i++)
     { 24   ... = field_b[memID][index + i];
647  → 25 if (some_condition) { alpha = beta; }
648  { 26 memID = getMemID(alpha);
     { 27 index = getIndex(alpha);
650  { 28 for (int i = 0; i < M; i++)
     { 29   ... = field_a[memID][index + i];
```

Fig. 6

SYSTEMS AND METHODS FOR ARRAY STRUCTURE PROCESSING

CROSS-REFERENCE TO RELATED APPLICATIONS

This is the first application filed for the present invention.

TECHNICAL FIELD OF THE INVENTION

This invention pertains generally to the field of compiler optimizations, and in particular, to structure peeling optimizations.

BACKGROUND

Structure peeling is a compiler optimization that transforms an array of structures (AOS) into a structure of arrays (SOA). For certain data access patterns of a user program, transforming an AOS into a SOA can speed up program execution, because it significantly reduces the number of cache misses.

For example, a structure can contain two fields: field "a", and field "b". If the C language is used, an AOS containing a number N of structures can be created using the memory allocation command "malloc", and loops that follow can access a single field of the structure.

Two fields of a structure can be interleaved in both a memory, and in a cache. In a program, a first coding loop, "Loop 1", can access cache locations corresponding to field "a", and skip field "b". Likewise, a second loop "Loop 2", can access cache locations corresponding to field "b", and skip field "a". Hence each loop can be limited to using only half of the data stored within the cache. However, this is not an optimal utilization of the cache, and it can result in poor performance of an application.

When data is transferred from the memory to the cache, it is transferred in units of cachelines. Thus, when a field "a" is accessed in Loop 1, and thus brought into the cache, an adjacent field "b" is also brought into the cache, because the field "b" shares the cacheline unit of field "a". Similarly, when a field "b" is accessed in Loop 2, a field "a" is brought into the cache again.

In structure peeling, the fields of an original structure are separated, or "peeled", into respective memory arrays. For an original structure "str", a number of up to N fields "a" are allocated contiguously in an array, pointed to by "arr_a". Likewise, a number of up to N fields "b" are allocated contiguously in an array, pointed to by "arr_b". Accesses to the original fields are also replaced with respective accesses to the peeled arrays.

In an optimized code, where an AOS has been transformed into an SOA, a first loop "Loop 1" of the transformed code accessing field "a" accesses a memory content that is equivalent to the memory content of the non-transformed code, but in which fields "a" are contiguous instead of being interleaved with fields "b", and similarly for Loop 2. Both loops can fully utilize the memory within the cache, which may improve performance.

While structure peeling is supported by some compilers of the prior art, when benchmarking the performance of a code generated by these compilers, it has been found that many compilers (e.g., the Open64 compiler) are unable to support complicated data types, unable to support data types that are allocated multiple times, unable to support cases where there are multiple arrays of a data type concurrently in use in a program, or unable to support cases where there are multiple pieces of memory in use concurrently in the program.

An example where a data type is allocated multiple times within a program, is where candidates for structure peeling are two AOS having a structure "str", that are allocated and pointed to by pointers arr_1 and arr_2, and that may eventually be swapped elsewhere in the program under some runtime condition.

An example where a data type is allocated multiple times within a program, is where candidates for structure peeling are two AOS having a structure "str", that are allocated and pointed to by pointers arr_1 and arr_2, and that may eventually be swapped elsewhere in the program under some runtime condition.

When a compiler is analyzing the program statically, it cannot determine which of the two AOS is being referenced, hence it cannot easily replace references to the structure fields with respective arrays in SOA form. Accordingly, there is a need for a way to identify to which array a pointer is pointing. In other words, structure peeling transformations of the prior art do not support data types that are allocated multiple times in the program. Furthermore, if the values of pointers pointing to arrays of the structure are swapped, then traditional structure peeling transformations cannot reliably identify the location of the memory the pointer is pointing to.

Therefore, there is a need for methods and systems to allow structure peeling in cases with complicated data types, such as data types that are allocated multiple times, cases where there are multiple arrays of a data type concurrently in use in a program, and cases where there are multiple pieces of memory in use concurrently in the program. Furthermore, there is a need for methods and systems to allow a structure peeling transformation to reliably identify the location of the memory the pointer is pointing to, even if the values of pointers pointing to arrays of the structure are swapped. Solutions to these issues would obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure allow structure peeling in cases with complicated data types, such as data types that are allocated multiple times, cases where there are multiple arrays of a data type concurrently in use in a program, and cases where there are multiple pieces of memory in use concurrently in the program. Furthermore, a structure peeling transformation according to embodiment can reliably identify the location of the memory the pointer is pointing to, even if the values of pointers pointing to arrays of the structure are swapped.

By concatenating a memory identifier with an array index of an original pointer, a tagged index according to embodiments allows a structure peeling transformation to reliably identify the location of the memory the pointer is pointing to, even if the values of pointers pointing to arrays of the structure are swapped. This allows for multiple allocations.

Technical benefits of embodiments include a quicker access to elements of an array that is part of a source code, whether access is by reading (loading) elements of an array, or writing (storing) elements into an array. This is allowed by an improved cache utilization as data accesses are reorganized to be contiguous within memory. Some embodiments provide for a lower number of cache misses as a hardware prefetcher is able to more efficiently prefetch the needed data into the cache. Some embodiments provide for a less computationally expensive way of locating elements of a corresponding peeled array, as a bit shift operation can be sufficient to locate elements, and a bit masking operation can be sufficient to mask out the memory identifier to get the real index. Additionally, a more flexible and tightly packed data layout can be achieved.

Because innumerable software programs make use of structures of arrays, any of these programs can benefit from an embodiment, regardless of their field of applications. However, an improvement may be more notable or significant in a software program that includes very large arrays such as, but not limited to those related to big data processing, deep neural networks, and multi-node networking applications.

An aspect of the disclosure provides a compiler optimization method. Such a method includes transforming an original array of structures into a peeled structure of arrays including defining a pointer for a structure, in the original array of structures, to be—an index of an array in the peeled structure of arrays, such method further includes—generating a memory identifier for each index of the array in the peeled structure of arrays; and—combining each memory identifier with a respective index of the array in the peeled structure of arrays to form a tagged index that uniquely identifies each element in the original array of structures.

In some embodiments, the method further includes determining that multiple allocations to the original array of structures is called for by a source code to be compiled.

In some embodiments, the method further includes, a compiler optimization method further comprises evaluating source code to be compiled to determine if structure peeling is appropriate.

In some embodiments, the method further includes, evaluating source code to be compiled to determine if structure peeling is appropriate comprises conducting a profitability analysis to determine if the source code calls for multiple allocations to the original array of structures.

In some embodiments, the method further includes evaluating source code to be compiled to determine if structure peeling is appropriate comprises conducting a safety analysis by verifying it is safe to transform the original array of structures.

In some embodiments, the method further includes generating a memory identifier is performed statically at compile time.

In some embodiments, the method further includes determining the number of allocations to the original array of structures that is called for by source code to be compiled.

In some embodiments, the method further includes generating a memory identifier is performed dynamically at run time.

In some embodiments, the method further includes performing a code versioning transformation when regions of code are duplicated, but each duplicate is specialized to handle a certain runtime condition.

In some embodiments, the steps of a compiler optimization method are performed as part of a compiler optimization while multiple source codes in intermediate representation form are being linked into one source code in intermediate representation form.

In some embodiments, the steps of a compiler optimization method are performed as part of a compiler optimization after multiple source codes in intermediate representation form have been linked into one source code in intermediate representation form.

In some embodiments, transforming an original array of structures into a peeled structure of arrays is for optimizing a data layout of their respective elements in a transitory memory.

In some embodiments, elements of an array from the peeled structure of arrays are stored contiguously in a memory and are contiguously accessible from the memory with a coded loop of instructions.

In some embodiments, transforming the original array of structures into a peeled structure of arrays is applied as a compiler optimization to increase the efficiency of an original program being compiled.

In some embodiments, the source code is for an original program and the number of unique memory identifiers for a data type is calculated by determining the number of allocations for that candidate data type that exist in the original program.

According to another aspect of the disclosure, there is provided an apparatus including a processor, and machine readable memory storing machine executable instructions which executed by the processor, implements a compiler module. The instructions include instructions to transform an original array of structures into a peeled structure of arrays by defining a pointer for a structure, in the original array of structures, to be an index of an array in the peeled structure of arrays. The instructions also include instructions to generate a memory identifier for each index of the array in the peeled structure of arrays; and instructions to combine each memory identifier with a respective index of the array in the peeled structure of arrays to form a tagged index that uniquely identifies each element in the original array of structures.

In some embodiments, the instructions further include instructions to determine that multiple allocations to the original array of structures is called for by source code to be compiled.

In some embodiments, the instructions further include instructions to generate a memory identifier statically at compile time.

In some embodiments, the instructions further include instructions to generate a memory identifier dynamically at run time.

In some embodiments, the instructions further include instructions to transform an original array of structures into a peeled structure of arrays to increase the efficiency of an original program being compiled.

In some embodiments, the instructions further include instructions to carry out other method steps disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIG. 2a shows an example C-like program, after having benefitted from a structure peeling optimization according to an embodiment.

FIG. 2b illustrates the layout of a SOA in a cache and a memory, for the optimized code in FIG. 2a.

FIG. 3 shows code with multiple AOS allocations and a swap, according to an embodiment.

FIG. 5 is an example of a program in C-like code to which an optimization according to embodiments could be applied.

FIG. 6 illustrates the result of having applied a structure peeling optimization according to an embodiment, to the original code of FIG. 5.

It will be noted that throughout the appended drawings, like features are identified by like reference numerals.

DETAILED DESCRIPTION

Although C programming commands are used in the present disclosure, these are exemplary and structure peeling can be applied regardless of the programming language. For example the term "structure" is a general type for data and is not only limited to C. In general, a "structure" holds a collection of data types under a single name. One example is the structure data type in C. Another example of this is the class data type used in C++. In this specification, the term structure refers to the most general form of the structure data type, which is not limited to C/C++, as other programming languages also have structure types.

To be amenable for a structure peeling transformation, a data type should be able to be allocated multiple times within a program. In other words, a program should be able to use multiple arrays of a data type, or multiple pieces of memory, concurrently.

For a structure peeling transformation to support the concurrent use of multiple arrays or multiple pieces of memory in a program, there needs to be a way to identify which array a pointer is pointing to. In methods of the prior art, peeling of such complicated data types is not solved.

A structure peeling optimization may transform an array-of-structures (AOS) into a structure-of-arrays (SOA). For a structure containing field "a" and field "b", an AOS containing a number N of structures can be created using the memory allocation command "malloc", and loops that follow can accesses a single field of the structure.

Figure 1A:
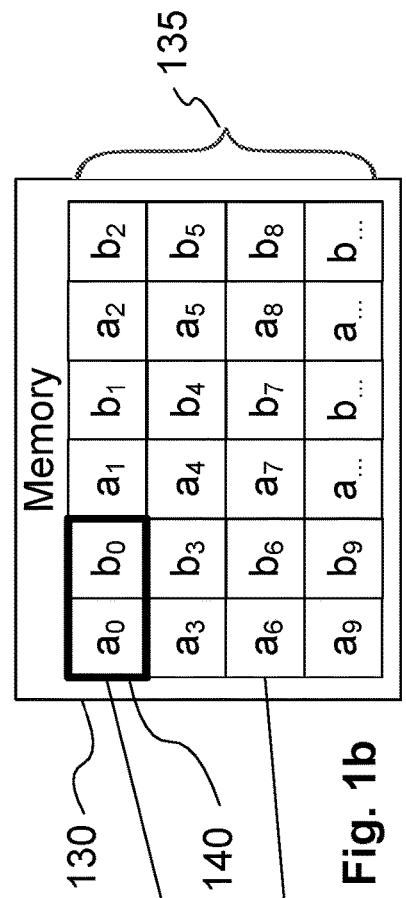
FIG. 1a shows an example C-like program according to prior art, that can benefit from a structure peeling optimization according to embodiments.

FIG. 1a shows an example C-like program according to prior art, that can benefit from a structure peeling optimization according to embodiments. An example of a structure is a structure called "str" 105, defined by two fields: an integer "a" and a floating point number (hereafter) float "b".

To make an array of such structures 105, a pointer "arr" to the array of structures can be defined. The pointer "arr" to an array of structures can be made to include many structures "str" 105, by allocating an array of "str" structures 110, of N elements of such structures, totaling a memory size of N times the size of such structure (N * sizeof(str)). In some embodiments using the C programming language, this can be implemented with an instruction such as "malloc". By allocating a memory region using a function like malloc( ) the function returns a pointer, which points to the beginning of the allocated memory space.

Also, by using a function like malloc( )to allocate memory, pointer "arr" will point to the first element (the start) of the newly allocated memory space. But elsewhere in the program, an offset can be added to the pointer "arr", which will then cause the pointer to point to an element away from the first element by that offset. Hence "arr" can point to any element in the array of "str" structures, depending on the index of the "arr" pointer.

The allocation of a memory space of N elements, where each element is "str" structure, allocates an array of structures, hence the value returned by a malloc( )instruction is a pointer to an array of structures.

When a for-loop 115 accesses the array of structures 105, it can access a single field, such as field "a", by storing a value into the field "a" with command "arr[i].a=. . . " 120. Another example of accessing a structure is to read a field such as field "b", with command ". . . =arr[i].b" 125. It is noted that in this example, the term "arr" refers to a pointer to the array of "str" structures.

The code in FIG. 1a results in field "a" and field "b" of the structures to be interleaved in both the memory and in the cache. The first loop accesses cache locations corresponding to field "a" while skipping field "b", and inversely for the second loop.

Figure 1B:
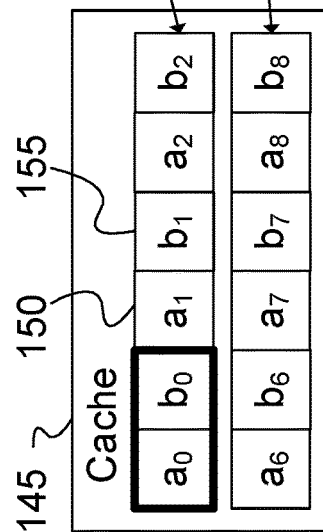
FIG. 1b illustrates the layout of an AOS in a cache and a memory for the code in FIG. 1a, according to prior art.

FIG. 1b illustrates the layout of an AOS in a cache and a memory for the code in FIG. 1a, according to prior art. A memory 130 contains an array 135 of structures 140 (AOS), where each structure 140 contains a field "a" and a field "b". The field "a" and field "b" of structures are interleaved in both the memory 130 and in the cache 145. When the first loop (115) accesses a cache location 150 corresponding to field "a", it must skip locations 155 corresponding to field "b", and inversely for the second loop. Hence a loop 115 can only be utilizing half of the data stored within the cache 145. Because each loop accesses only half the data stored in the cache, the code of FIG. 1a is not an optimal utilization of the cache and it can result in poor performance of an application.

In a structure peeling transformation, the fields of an original structure are separated, i.e. "peeled", into respective memory arrays (called peeled arrays) that are pointed to with respective pointers. The number N of locations of a field "a" are allocated contiguously with a pointer "arr_a". Likewise, for a field "b" and a pointer "arr_b". Accesses to the original fields are also replaced with respective accesses to the peeled arrays.

In an embodiment, a pointer is a variable storing the memory address of another variable, such as the memory address of an element of an array.

In an embodiment, an index is a variable identifying an element of an array.

Figures 2A, 2B:
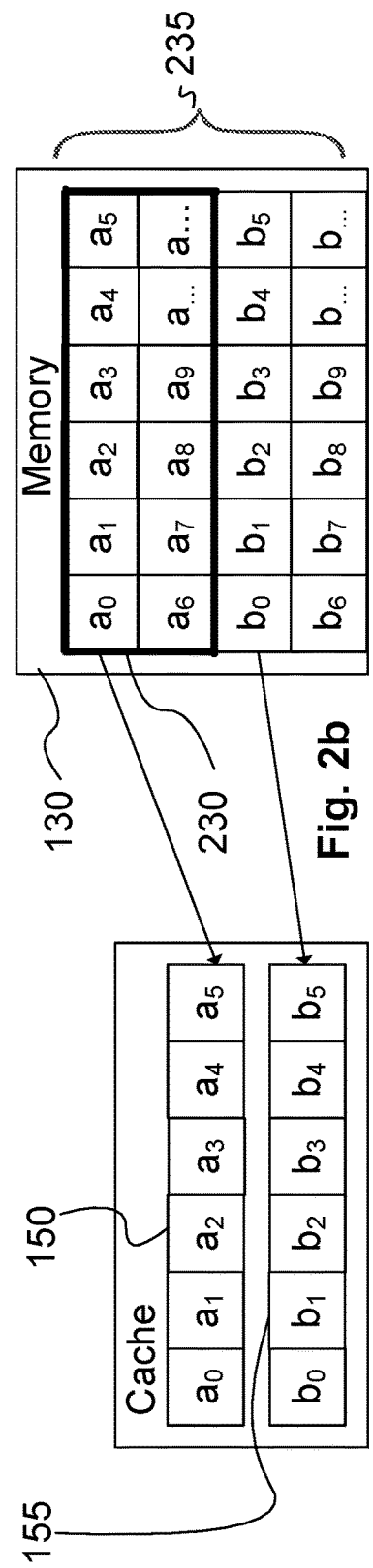

FIG. 2a shows an example C-like program, after having benefitted from a structure peeling optimization according to an embodiment. Unlike the example in FIG. 1a, two structures are defined instead of one: one structure "str_a" 205 for fields "a", and one structure "str_b" for fields "b". A pointer "arr_a" 212 for an array of structures "str_a" 205 is defined, and allocated memory size N. Likewise for pointer "arr_b"

215 and structures "str_b" 210. Each pointer of "arr_a" and "arr_b" contains one kind of field, and together, they can be referred to as a structure of arrays (SOA). While examples are discussed herein using two types of fields (integers and floating point numbers), these are just examples and the methods and systems discussed herein can apply to SOAs including other data types.

Unlike the example in FIG. 1a, in a peeled structure according to embodiments, a separate pointer is defined for each kind of field: pointer "arr_a" 212 for fields "a" 205, and pointer "arr_b" 215 for fields "b" 210. A field in either one can be accessed by a writing (storing) loop 220 or a reading (loading) loop 225 via its respective pointer.

FIG. 2b illustrates the layout of a SOA in a cache and a memory, for the optimized code in FIG. 2a. In this case, a memory 130 contains a structure 235 of arrays 230 (SOA), where each array 230 contains either fields "a" or fields "b", each field laid out in a contiguous fashion. When a loop such as a writing loop 220 of the optimized code accesses a field "a" 150, it accesses memory locations that are laid out contiguously. And similarly, when a reading loop 225 of the optimized code accesses a field "b" 155, it accesses memory locations that are laid out contiguously. And similarly for a reading loop 225. With such a layout, either loop can fully utilize the memory within the cache, which can improve run-time performance.

To be amenable for a structure peeling transformation, it should be possible for a data type to be allocated multiple times within a program. In other words, a program should be able to use multiple arrays of a data type, or multiple pieces of memory, concurrently.

FIG. 3 shows code with multiple (two) AOS allocations and a swap, according to an embodiment. After defining a structure 305 of two fields, a first pointer "arr_1" 310 is defined to point to a structure representing an array of structures 305, the pointer allocated a memory size N. A second pointer 310 is for a structure called "arr_2" representing another array of structures, this array also allocated a memory size N. Each of the two arrays of structures, pointed to by "arr_1" and "arr_2", is a candidate for structure peeling. It should be appreciated that in some embodiments, it is not appropriate to structure peel every AOS. Accordingly, in some embodiments, candidate AOSs are evaluated to determine if structure peeling is appropriate. For example, the embodiments described herein are advantageous over prior art methods if multiple AOS allocations are utilized. Accordingly, in some embodiments the method further includes determining that multiple allocations to the original array of structures is called for by source code to be compiled.

In an embodiment, having multiple allocations of the candidate AOS is having two or more AOS of the structure to be peeled appear in the program that is to be compiled and optimized. An allocation of a candidate AOS can be a static allocation with a fixed size placed into stack memory, or it can be a dynamic allocation into heap memory (as in FIG. 3). The number of allocations to the candidate AOS may be countable statically (e.g., during program compilation) as in FIG. 3 where it is known that there are exactly two allocations in the program. In other cases, the number of allocations to the candidate AOS can be not countable statically, and only countable during run-time (dynamically)..

Under some runtime condition 320, it is possible for the pointers to be swapped 315 elsewhere in the program. However, if the program is later analyzed statically, a compiler cannot determine which one of the two AOS is being referenced, and hence the compiler cannot easily replace a reference to an AOS fields with a respective reference to an SOA field. There needs to be a way to identify which array a pointer is pointing at, regardless of swapping.

Structure peeling transformations of the prior art do not handle data types that are allocated multiple times in a program. Furthermore, if the values of pointers pointing to arrays of the structure are swapped, then peeling transformations of the prior art may not be able to identify the memory location a pointer is referring to.

In a structure peeling optimization according to embodiments, a pointer 110, 120, 125 that points to an element in an original AOS of an original data type, is transformed into an array index 212, 215, 220, 225 that points to a respective element of a corresponding peeled array (a peeled array being a structure of arrays SOA), and that is further "tagged".

Embodiments include an index that is "tagged" with a memory identifier associated to a memory allocation. In this specification, the term tagged index refers to an index tagged with such a memory identifier. A memory identifier according to embodiments, which can be referred to as "MemID", is a unique positive integer that can be short, such as a few bits in width. At any point in a program, the memory identifier can be extracted from a pointer, in order to correctly locate the piece of memory the pointer is pointing to. As for the original pointer, it can get transformed into an index after the structure peeling optimization.

Figure 4:
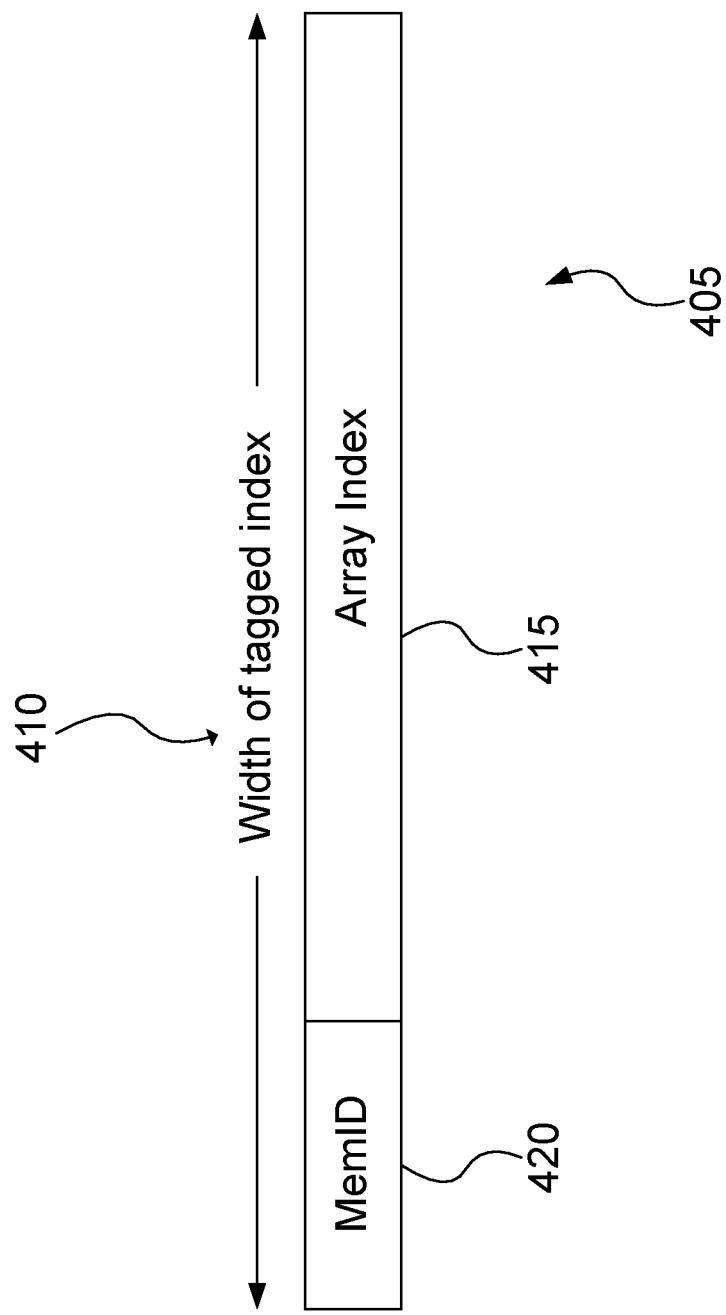
FIG. 4. illustrates a tagged index resulting from transforming a pointer to an original AOS, into a tagged index according to an embodiment.

FIG. 4, illustrates a tagged index resulting from transforming a pointer to an original AOS, into a tagged index according to an embodiment. An original pointer to an AOS is transformed into a tagged index 405 that includes an array index 415 corresponding to the element of the array that the original pointer is pointing to, as well as a memory identifier (MemID) 420 for correctly locating the piece of memory the original pointer is pointing to. The tagged index 405 can having a certain number of bits, represented by a width 410, some of which bits are used for an array index 415, and others for a memory identifier (MemID) 420.

In structure peeling according to an embodiment, a pointer pointing to an element in the original AOS is transformed into a tagged index corresponding to the element the original pointer was pointing to.

A structure peeling transformation according to an embodiment can be applied by a compiler as a kind of optimization. One approach is to convert a pointer used to calculate the memory address of an affected data type in the program, into an indirect memory reference. For example, a direct load (read) such as:

pointer_affected_type -> field1 where the "->" refers to accessing a field called "field1" of a pointer called "pointer_affected_type", can be converted into:

array_field1[index]

where the array "array_field1[index]" is the memory for a data type (like "arr_a[i]" 220 in FIG. 2a), and the "pointer_affected_type" variable in an original program is being used as the index.

When there are multiple memory allocations in a program, and when a memory identifier is used, an approach according to an embodiment can differ from one of prior art as follows: the memory identifier value 420 and the array index value 415 can be concatenated to form the tagged index 405. Accordingly instead of using a pointer of the original untransformed program, it is the value of the tagged index 405, resulting from concatenating the memory identifier value 420 and the index value 415, that is used.

However, embodiments are not limited to using the form shown FIG. 4, and a memory identifier 420 and an index value 415 can be concatenated in other ways instead. The number of bits required for a memory identifier 420 to ensure that each allocation site is assigned a unique value is proportional to $\log_2(N)$ where N is the number of candidate AOS in the program.

At each call site for a memory allocation function (i.e., a memory allocation function such as "calloc", "malloc", etc., but not restricted to C-like allocations), a unique memory identifier 420 is generated, and more specifically: a unique integer is generated, either statically (at compile time), or dynamically (at runtime). The memory identifier 420 is then concatenated with an array index 415 to form the tagged index 405 to locate an individual element of the array. The resultant value can then be stored into the variable which, in the original program, is the pointer holding the value of the memory address returned by the memory allocation function. In the transformed program, each pointer of a peeled data type is converted into a tagged index.

When a memory identifier 420 is applied to structure peeling for a data type, an additional operation can be performed to extract its value. For example, the direct load above:

pointer_affected_type ->field1 can get converted to a two-dimensional array:

array_field1[memory identifier][index]

where the array:

array_field1[memory identifier]

is the memory of the data type containing the element that gets pointed to by the pointer:

pointer_affected_type.

The memory identifier 420 selects the correct array among the multiple ones allocated. To get the variable:

pointer_affected_type, a bit mask operation can be performed to remove the memory identifier 420, and the result can be used as the index 415.

When memory is reallocated, such as with a "realloc" function (but not limited to C-like reallocations), then the memory identifier 420 can be kept while the memory of the array is resized to reflect the memory reallocation.

In an embodiment, code versioning can be used to handle a different number of allocations in the program. For example, when a structure peeling analysis determines that there are only 2 memory allocations, then only 1 bit is required to store the memory identifier. In contrast, when 4 memory allocations are performed, then 2 bits are required. However, when a transformation analysis cannot statically determine the number of memory allocations performed, then code versioning can be performed to ensure that the number of bits allocated is sufficient for the program to perform correctly.

FIG. 5 is an example of a program in C-like code to which an optimization according to embodiments can be applied. In this case, the program contains multiple (i.e., two) AOS allocation sites, as well as a swapping of the pointers pointing to the different arrays of structures. Lines 1-4 (505) define the structure type str that is a candidate for structure peeling. Line 5 (510) allocates the first AOS of structures str, and the memory region is pointed to by pointer "alpha". Line 6 (515) allocates a second AOS of structures str, and the memory region is pointed to by pointer "beta". Lines 7-8 (520) shows a loop accessing the field "a" of each structure str in the memory region pointed to by "alpha". Similarly, lines 9-10 (525) show a loop accessing field "b" of each structure str in the memory region pointed to by "beta". Line 11 (530) reassigns pointer "alpha" to "beta if "some_condition" is true. Thus if "some_condition" is true, then alpha, which initially pointed to the AOS allocated in line 5 (510), will now point to the AOS allocated in line 6 (515). Lines 12-13 (535) call for a loop to access field "a" of structures str, in the memory region pointed to by "alpha", which could be either the AOS allocated in line 5 (510), or line 6 (515), depending on the branch taken in line 11 (530).

FIG. 6 illustrates the result of having applied a structure peeling optimization according to an embodiment, to the original code of FIG. 5. Lines 1-2 (605) define the peeling of the original structure str. Each field of the original structure is "peeled" into its own separate definition. Field "a" is peeled in line 1 and field "b" is peeled in line 2. Allocation sites for the original AOS will be split into separate allocations for each peeled field, thereby making the SOA. Lines 6-7 (620) show splitting of the original AOS pointed to by "alpha" 510. Similarly, lines 12-13 (625) show splitting of the original AOS pointed to by "beta" 515.

During compilation, structure peeling will try to replace references to the original AOS with references to the corresponding array in the transformed program. Ideally, an original access to element alpha[i].a of a structure in an AOS, would be replaced with an access to element alpha_a [i] of an array in a SOA. However, in the presence of multiple allocations and pointer swapping, this can be impossible due to the limitations of a compiler's static analysis and transformation. A compiler cannot statically determine which access corresponds to which AOS (or to which SOA in the transformed program), and thus it cannot ensure that transforming the program will result in something that is functionally correct. Reference to the original structures 505 of an AOS, for field "a" and field "b" will eventually be replaced with the containers defined in lines 3-4 (610) and line 4 (615) respectively, which contain the arrays of the SOA within the transformed program. The original pointers "alpha" 510 and "beta" 515 are transformed to represent indices which are then used to access the SOA. The pointer for "alpha" 510 is transformed into an index in line 5 (617) and this new index will be used to index into the SOA in lines 6-7 (620). Similarly, the pointer for "beta" 515 is transformed into an index in line 11 (623), and as such, it will be used to index into the SOA in lines 12-13 (625).

Because a program can contain an arbitrary amount of pointer swaps between different live copies of an original AOS, a method is required to determine which copy is being accessed at any given time. Therefore, embodiments include the assignment of a unique memory identifier value to each copy of an original AOS. Line 8 (621) implements code that will concatenate a unique value of id_0, as a memID 420, with the index value for "alpha", as an array index 410, and likewise for "beta" in line 14 (630), where a unique value id_1 is concatenated as a memID 420 with the transformed index value, which is an array index 415.

In lines 9-10 (622) and lines 15-16 (635), a transformed SOA is stored into the containers defined in lines 3-4, using their corresponding unique identifiers. An SOA corresponding to an original AOS can be retrieved through containers, by using the unique memory identifiers 420. Accesses to original AOSs are replaced with accesses to corresponding SOAs, through the corresponding containers of lines 19-20 (640), lines 23-24 (645), and lines 28-29 (650). To get the correct SOA and to get the index to access the correct element of the SOA, the index is extracted from the transformed, concatenated indexes in lines 8 and 14 (621, 630) through code represented by the functions "getMemID" and "getIndex" as in lines 17 and 18 (637). Whether or not the conditional branch in line 25 (647) is taken, the correct memory identifier and index of the SOA will be obtained in lines 26 and 27 (648) respectively. By using this method of structure peeling, it is possible to disambiguate, dynamically, which SOA is being accessed, and hence to transform the code statically.

Figure 7:
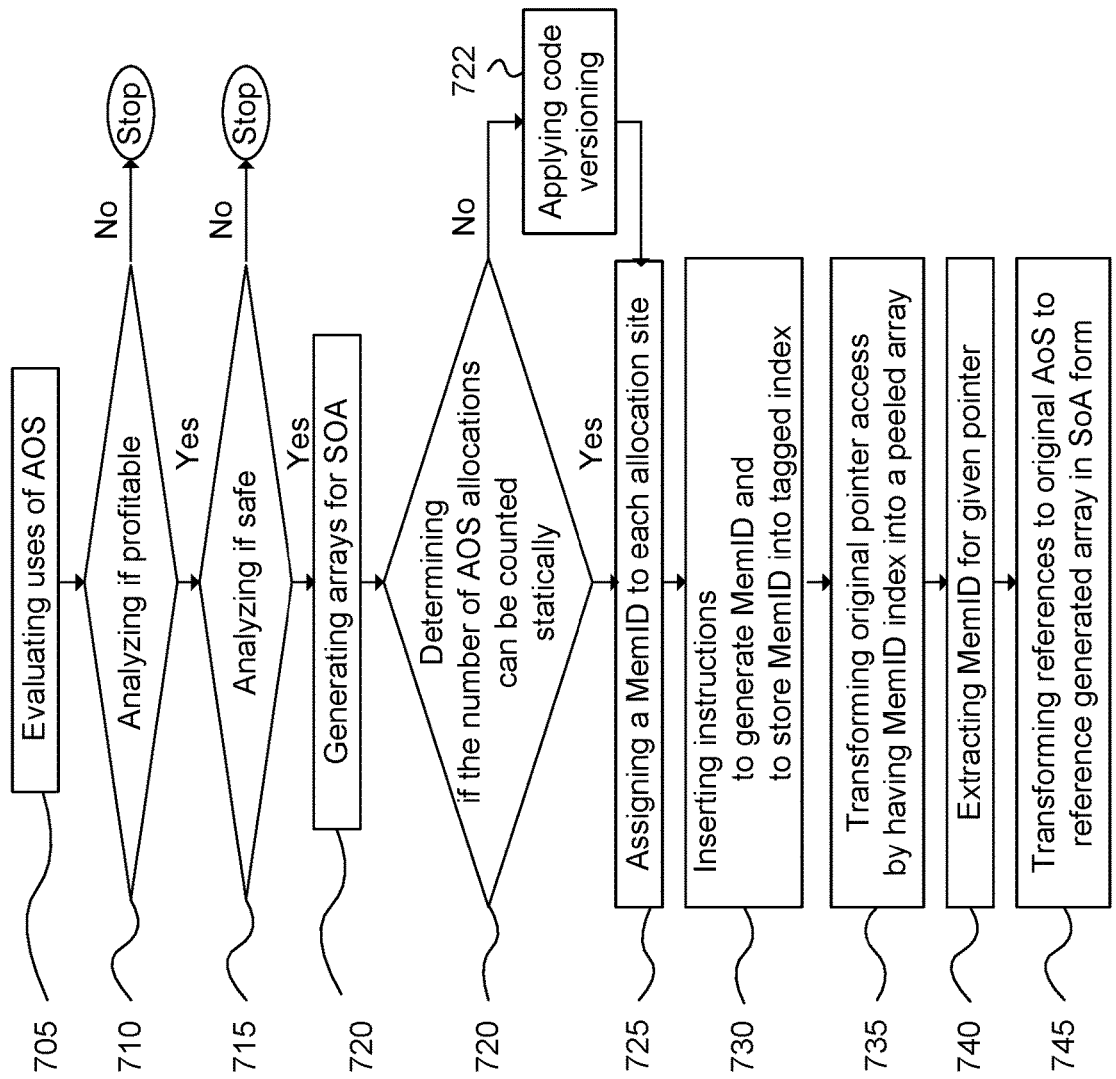
FIG. 7 illustrates a flow diagram for a structure peeling transformation, performed as a compiler optimization, including memory identification (MemID) support, according to an embodiment

FIG. 7 illustrates a flow diagram for a structure peeling transformation, performed as a compiler optimization, including memory identification (MemID) support, according to an embodiment.

For a candidate data type with one or more AOS allocations, an initial step of a structure peeling optimization is to-evaluate 705 uses of the one or more AOSs within the program.

As stated above, in some embodiments, candidate AOSs are evaluated to determine if structure peeling is appropriate. For example, as stated above, embodiments discussed herein provide advantages if multiple allocations are called for by the source code to be compiled and optimized.

In some embodiments, this evaluation to determine if structure peeling is appropriate can include one of both of a profitability analysis 710 and a safety analysis 715. The compiler optimization can perform a profitability analysis 710 by determining whether or not structure peeling will improve performance of the application. A profitability analysis 710 can include, determining the spatial locality of the references to the transformation candidate. In some embodiments, the profitability analysis 710 can determine whether multiple allocations to the AOS is required. A profitability analysis is optional.

Then, the compiler optimization can perform a safety analysis 715 (i.e., a "legality" analysis) by verifying whether or not it is safe to transform the candidate AOS (or candidates if there are multiple allocations). A safety analysis can include, but is not limited to, verifying that all memory references, to and from a candidate's access memory, are within the bounds of their own allocated memory. In other words, a memory reference to a candidate AOS should not access memory of another data type or of an unknown memory location.

If profitable and safe (i.e. if profitable and legal), the compiler optimization can peel the structure into SOA form by generating 720 arrays for the SOA, where the peeled arrays can facilitate the memory identifier (MemID) 420. The number of unique MemIDs needed can be calculated by determining the number of allocations to the candidate data type, that exist in the program. At this point, if the compiler is unable to statically determine the amount of AOS allocations of the candidate data type (e.g., when allocations are called in a loop with unknown loop iteration count), it can also apply 722 code versioning. Multiple code paths can be generated, each one with a different width of MemID to support a different number of allocations.

Then, the compiler optimization can assign 725 a unique MemID 420 for each memory allocation site encountered. This can be done either statically at compile time or dynamically at runtime. It can then associate the MemID 420 to the value 415 assigned to the indexes of the transformed code, thereby creating a tagged index 405. For a memory reallocation (e.g., a "realloc" instruction in C), the same MemID can be kept. Instructions can be inserted 730 for such purpose.

When a candidate structure is accessed via a pointer in the original program, the compiler optimization can transform 735 the original pointer access by performing an operation sequence to extract 740 both the MemID 420 and the Array Index 415. The MemID is used to access the correct peeled array corresponding to the one of the original AOS. Once the correct peeled array is accessed through the MemID, the array index is used index into the peeled memory.

Then, the compiler optimization can transform 745 the references to fields in the original AOS form, to reference the corresponding generated peeled arrays instead.

Figure 8:
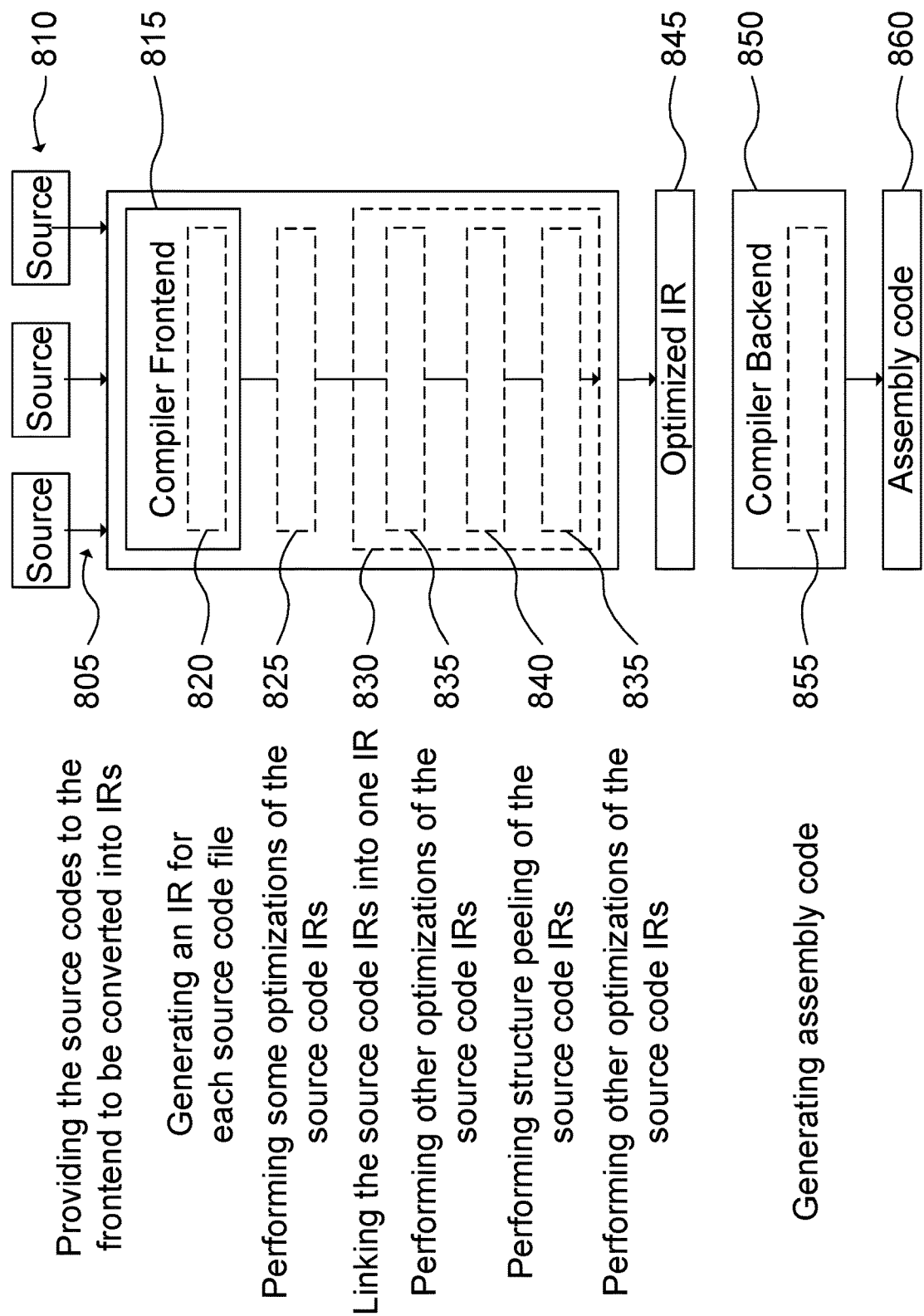
FIG. 8 illustrates a compilation pipeline including a structure peeling optimization, according to an embodiment.

FIG. 8 illustrates a compilation pipeline including a structure peeling optimization, according to an embodiment. Initially, a compilation process can provide 805 one or more source code files 810 of the program to a compiler frontend 815, which can generate 820 an intermediate representation (IR) for each code file. It can also perform 825 various optimizations as may be required and link 830 the separate IRs into one optimized IR.

A link-time optimization (LTO) 830 can include sub-steps such as various further optimizations 835, including structure peeling 840 in accordance with embodiments.

An optimized IR 845 of the source code resulting from link-time optimization (LTO) 830, can be provided to the compiler backend 850, for it to generate 855 assembly code 860 for a target system.

Some embodiments include a compiling process where structure peeling is performed elsewhere than within a link-time optimization, and the sequence in FIG. 8 is merely an example of a functioning compilation pipeline. Furthermore, optimizations 825 and 835 can include zero or more different compiler optimization passes.

Some embodiments allow an improved utilization of a cache because accesses to data, e.g. reads and writes, are reorganized to be contiguous within the memory.

Some embodiments allow less cache misses, because with a contiguous organization of data, a hardware prefetcher is able to more efficiently prefetch cache data.

The use of a memory identification such as a memory identification (MemID) according to embodiments is a less computationally expensive way of locating a corresponding peeled memory, because a bit shift operation can be sufficient to locate a memory array, among potentially multiple ones of an affected data type, and a bit masking operation can be sufficient to mask out the memory identifier to obtain a real index.

Some embodiments allow a data layout that is more flexible and more tightly packed than one of the prior art. For example, a data layout according to some embodiments does not require the transformed structure to have specific field alignments. An embodiment can therefore be more general, versatile and efficient in its use of memory and/or cache.

A structure peeling compiler optimization according to some embodiments can handle a structure that is allocated multiple times, in contrast to one of the prior art. By including a memory identifier, a memory access (i.e., read or write, load or store) operation into one of multiple arrays of structures can be transformed into an indirect load/store operation.

Some embodiments include a method for selecting (i.e., disambiguating) a correct piece of memory, the method being to use 621, 630, 725 a memory identifier 420. Embodiments also include code versioning to handle memory size requirements, so as to avoid overflowing index and memory identifier arithmetic operations.

Some embodiments can include performing code versioning to handle different number of allocations in a program. In a compiler, a code versioning transformation is when regions of code are duplicated, but each duplicate is specialized to handle a certain runtime condition. In an embodiment, a static analysis for a structure peeling transformation might be able to determine that there are only two (2) AOS memory allocations, in which case 1 bit is sufficient to store the memory identifier. However, if four (4) AOS memory allocations are to be executed, then two (2) bits are needed. When a static analysis cannot determine the number of memory allocations instructed, then code versioning can be performed to ensure that a sufficient number of bits are allocated for the program to run correctly.

When code versioning is performed, code paths, within parts of the program, that extract and set a memory identifier, are duplicated. Each code path is specialized to support a different size of memory identifier bits, corresponding to the number of AOS allocations that are executed dynamically. The amount of dynamic AOS allocations to be executed will determine which versioned code path is taken by the program.

In some embodiments, transforming the original array of structures into a peeled structure of arrays is applied as a compiler optimization utilizes a hardware prefetcher to prefetch array data from a cache.

In some embodiments, the original array of structures is part of an original program instructing multiple arrays of a data type to be used concurrently.

In some embodiments, the number of bits for the memory identifier is proportional to the logarithm base two of N ($log_2[N]$), where N is the number of original arrays of structures in an original program being compiled.

In some embodiments, the method may further includes using a bit shift operation to locate a desired array among multiple arrays having the same data type and belonging to the program being compiled.

In some embodiments, the method further includes using a bit masking operation to mask out the memory identifier from a tagged array to obtain an index of an array.

In some embodiments, combining each memory identifier with a respective index of the array in the peeled structure of arrays is a concatenation of a memory identifier and an index of the array.

In some embodiments, combining each memory identifier with a respective index of the array in the peeled structure of arrays is an interleaving of bits of a memory identifier and an index of the array.

Figure 9:
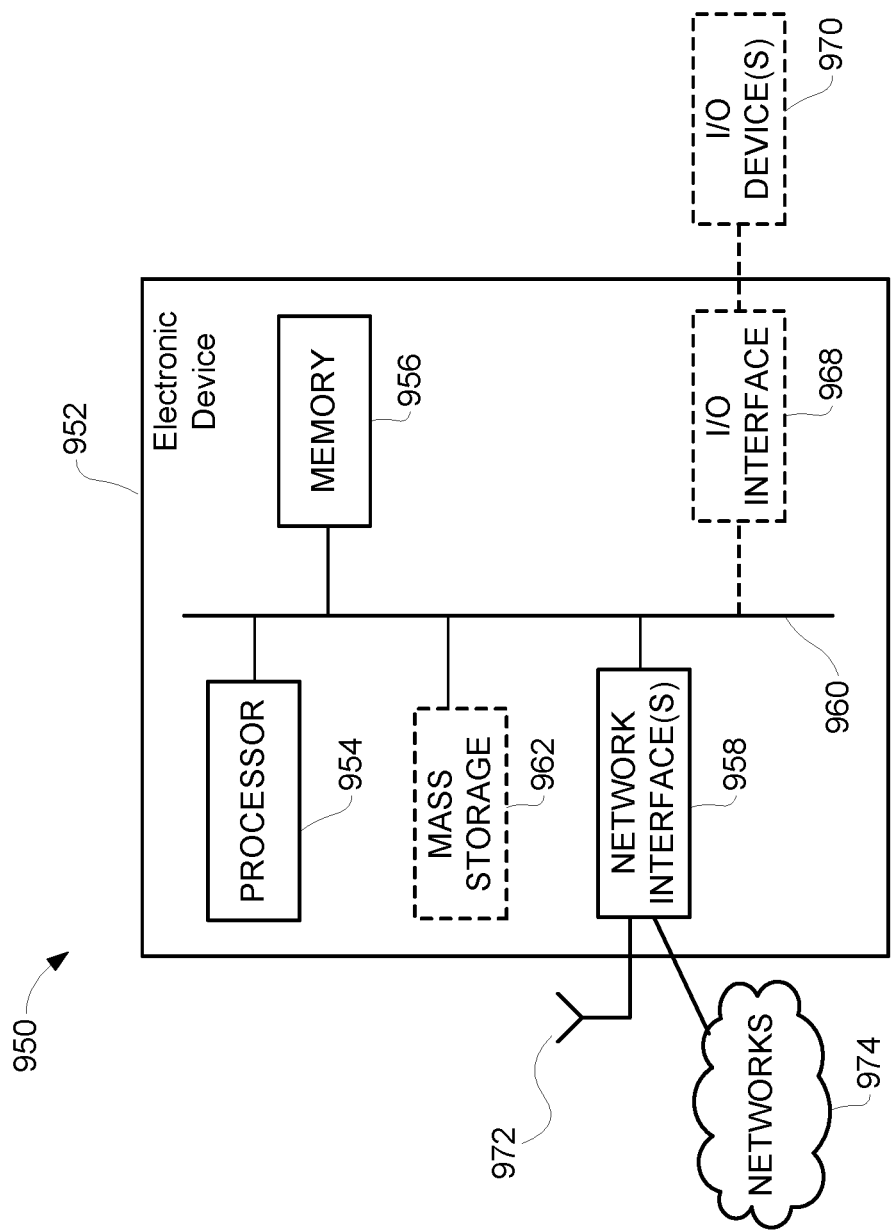
FIG. 9 is a block diagram of an electronic device that may be used for structure peeling according to an embodiment.

FIG. 9 is a block diagram of an electronic device (ED) 952 illustrated within a computing and communications environment 950 that may be used for implementing the devices and methods disclosed herein, such as a program and a compiler. The electronic device 952 typically includes a processor 954, such as a central processing unit (CPU), and may further include specialized processors such as a field programmable gate array (FPGA) or other such processor, a memory 956, a network interface 958 and a bus 960 to connect the components of ED 952. ED 952 may optionally also include components such as a mass storage device 962, an I/O interface 968, and I/O device(s) 970.

The memory 956 may comprise any type of non-transitory system memory, readable by the processor 954, such as static random-access memory (SRAM), dynamic random-access memory (DRAM), synchronous DRAM (SDRAM), read-only memory (ROM), or a combination thereof. In an embodiment, the memory 956 may include more than one type of memory, such as ROM for use at boot-up, and DRAM for program and data storage for use while executing programs. The bus 960 may be one or more of any type of several bus architectures including a memory bus or memory controller, a peripheral bus, or a video bus.

The electronic device 952 may also include one or more network interfaces 958, which may include at least one of a wired network interface and a wireless network interface. A network interface 958 may include a wired network interface to connect to a network 974, and also may include a radio access network interface 972 for connecting to other devices over a radio link. The network interfaces 958 allow the electronic device 952 to communicate with remote entities such as those connected to network 974.

The mass storage 962 may comprise any type of non-transitory storage device configured to store data, programs, and other information and to make the data, programs, and other information accessible via the bus 960. The mass storage 962 may comprise, for example, one or more of a solid-state drive, hard disk drive, a magnetic disk drive, or an optical disk drive. In some embodiments, mass storage 962 may be remote to the electronic device 952 and accessible through use of a network interface such as interface 958. In the illustrated embodiment, mass storage 962 is distinct from memory 956 where it is included and may generally perform storage tasks compatible with higher latency but may generally provide lesser or no volatility. In some embodiments, mass storage 962 may be integrated with a heterogeneous memory 956.

In an embodiment, an array of structures, a structure of arrays, an original program, a compiled program and a compiler can be stored on any of a memory 956, including a cache, and a mass storage 962. An original program, a compiled program and a compiler can be run with a local processor 954. The network interface 958 and I/O interface 968 can also allow for storage and/or processing to occur externally.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A compiler optimization method, comprising:
   transforming an original array of structures into a peeled structure of arrays including:
      defining a pointer for a structure, in the original array of structures, to be an index of an array in the peeled structure of arrays;
      generating a memory identifier for each index of the array in the peeled structure of arrays; and
      combining each memory identifier with a respective index of the array in the peeled structure of arrays to form a tagged index that uniquely identifies each element in the original array of structures.

2. The method of claim 1, further comprising determining that multiple allocations to the original array of structures is called for by source code to be compiled.

3. The method of claim 1, further comprising evaluating source code to be compiled to determine if structure peeling is appropriate.

4. The method of claim 3, wherein evaluating source code to be compiled to determine if structure peeling is appropriate comprises:
   conducting a profitability analysis determining if the source code calls for multiple allocations to the original array of structures.

5. The method of claim 3, wherein evaluating source code to be compiled to determine if structure peeling is appropriate comprises:
   conducting a safety analysis by verifying it is safe to transform the original array of structures.

6. The method of claim 1, wherein generating a memory identifier is performed statically at compile time.

7. The method of claim 6, further comprising determining the number of allocations to the original array of structures that is called for by source code to be compiled.

8. The method of claim 1, wherein generating a memory identifier is performed dynamically at run time.

9. The method of claim 8, further comprising performing a code versioning transformation when regions of code are duplicated, but each duplicate is specialized to handle a certain runtime condition.

10. The method of claim 1, wherein the steps are performed as part of a compiler optimization while multiple source codes in intermediate representation form are being linked into one source code in intermediate representation form.

11. The method of claim 1, wherein the steps are performed as part of as a compiler optimization after multiple source codes in intermediate representation form have been linked into one source code in intermediate representation form.

12. The method of claim 1, wherein transforming the original array of structures into a peeled structure of arrays is for optimizing a data layout of their respective elements in a transitory memory.

13. The method of claim 1, wherein elements of an array from the peeled structure of arrays are stored contiguously in a memory and are contiguously accessible from the memory with a coded loop of instructions.

14. The method of claim 1, wherein transforming the original array of structures into a peeled structure of arrays is applied as a compiler optimization to increase the efficiency of an original program being compiled.

15. The method of claim 5, wherein the source code is for an original program and the number of unique memory identifiers for a data type is calculated by determining the number of allocations for that candidate data type that exist in the original program.

16. An apparatus, comprising:
   a processor:
   machine readable memory storing machine executable instructions which executed by the processor, implements a compiler module, the instructions including:
      instructions to transform an original array of structures into a peeled structure of arrays by defining a pointer for a structure, in the original array of structures, to be an index of an array in the peeled structure of arrays;
      instructions to generate a memory identifier for each index of the array in the peeled structure of arrays; and
      instructions to combine each memory identifier with a respective index of the array in the peeled structure of arrays to form a tagged index that uniquely identifies each element in the original array of structures.

17. The apparatus of claim 16, further comprising instructions to determine that multiple allocations to the original array of structures is called for by source code to be compiled.

18. The apparatus of claim 16, further comprising instruction to generate a memory identifier statically at compile time.

19. The apparatus of claim 16, further comprising instruction to generate a memory identifier dynamically at run time.

20. The apparatus of claim 16, further comprising instructions to transform an original array of structures into a peeled structure of arrays to increase the efficiency of an original program being compiled.

* * * * *